US012731472B2

(12) United States Patent
Childers

(10) Patent No.: US 12,731,472 B2
(45) Date of Patent: Sep. 8, 2026

(54) UNIVERSAL EMERGENCY ALARM SYSTEM

(71) Applicant: Mark Childers, Cincinnati, OH (US)

(72) Inventor: Mark Childers, Cincinnati, OH (US)

( * ) Notice: Subject to any disclaimer, the term of this patent is extended or adjusted under 35 U.S.C. 154(b) by 26 days.

(21) Appl. No.: 18/951,571

(22) Filed: Nov. 18, 2024

(65) Prior Publication Data

US 2025/0166474 A1 May 22, 2025

Related U.S. Application Data

(60) Provisional application No. 63/600,555, filed on Nov. 17, 2023.

(51) Int. Cl.
*G08B 7/06* (2006.01)
*G08B 25/12* (2006.01)

(52) U.S. Cl.
CPC ............... *G08B 7/06* (2013.01); *G08B 25/12* (2013.01)

(58) Field of Classification Search
CPC .................................. G08B 7/06; G08B 25/12
See application file for complete search history.

(56) References Cited

U.S. PATENT DOCUMENTS

| | | | |
|---|---|---|---|
| 7,999,692 B2 | 8/2011 | Sendrowski, Jr. | |
| 8,138,928 B2 | 3/2012 | Farley et al. | |
| 9,142,103 B2 | 9/2015 | Robotham et al. | |
| 9,286,790 B2 | 3/2016 | Lyman et al. | |
| 9,406,205 B2 | 8/2016 | Keller et al. | |
| 9,922,516 B2 | 3/2018 | Jones, Jr. et al. | |
| 10,679,480 B2 | 6/2020 | Eckert et al. | |
| 10,867,487 B2 | 12/2020 | Eddins et al. | |
| 11,145,182 B2 | 10/2021 | Delgado et al. | |
| 11,183,040 B2 | 11/2021 | Lyman et al. | |
| 11,189,141 B2 | 11/2021 | Armpriester et al. | |
| 11,252,273 B2 | 2/2022 | Merjanian et al. | |
| 2013/0346333 A1* | 12/2013 | Hassler | G06Q 10/00 705/325 |
| 2015/0215755 A1 | 7/2015 | Bekanich | |
| 2017/0004694 A1 | 1/2017 | Dodson | |
| 2017/0069196 A1 | 3/2017 | Jacobs | |
| 2020/0388137 A1 | 12/2020 | Bauldree et al. | |

(Continued)

FOREIGN PATENT DOCUMENTS

EP 3104352 B1 9/2017

OTHER PUBLICATIONS

European Patent Office; Supplementary Search Report issued in EP3580732 dated Nov. 2, 2020.

*Primary Examiner* — Sisay Yacob
(74) *Attorney, Agent, or Firm* — Dinsmore & Shohl, LLP

(57) ABSTRACT

The disclosed universal emergency alarm system is capable of alerting occupants of one or more emergencies through one universal alarm system with the use of one or more decentralized alarm panels and one or more alarms. Certain embodiments of the alarm system also comprise one or more centralized alarm panels and emergency dispatch. Emergencies can include weather or natural disaster emergencies, manmade or criminal activity emergencies, dangerous situation emergencies, Wireless Emergency Alerts (WEA) from state or local government authorities, or the like. A mobile app can be used to create and communicate with one or more connectivity zones, zone members, connectivity communities, community members, and emergency dispatch authorities.

18 Claims, 5 Drawing Sheets

(56) References Cited

U.S. PATENT DOCUMENTS

| | | | | |
|---|---|---|---|---|
| 2021/0043053 | A1* | 2/2021 | Kronz | G08B 7/066 |
| 2021/0090417 | A1 | 3/2021 | Bailey et al. | |
| 2021/0280048 | A1* | 9/2021 | McNutt | G08B 19/005 |
| 2024/0212479 | A1* | 6/2024 | Cole | G08B 25/12 |

* cited by examiner

UNIVERSAL EMERGENCY ALARM SYSTEM

CROSS REFERENCE TO RELATED APPLICATIONS

This application claims the benefit of and priority to U.S. Provisional Patent Application No. 63/600,555, filed on Nov. 17, 2023, the entire contents of which are hereby incorporated by reference.

BACKGROUND

Technical Field

The disclosed technology relates in general to emergency alarm systems, and more specifically, to a universal emergency alarm system that notifies individuals of various types of emergencies through color-specific lights, flash patterns, and audio-specific noises.

Description of Related Art

People in schools, businesses, and other private and public buildings require clear understanding and direction when an emergency occurs. Different emergencies necessitate different responses and actions to keep students, workers, and patrons safe. For example, when active shooter and mass shooting situations arise, time and awareness are critical for student, worker, and patron safety. Conventional alarm systems and solutions announce the ongoing emergency over an audio public address ("PA") system, through alarms with sound and light, or through individualized means, such as cell phone contact. However, in many schools and other buildings, cell phone reception is limited in all or certain areas of the building. PA systems may not function universally throughout the building. In rooms where the audio does function, the audio is often too soft or unclear to understand the emergency announcement, or cannot be heard over environmental noise. For example, in areas of a school such as music rooms, welding and machine labs, or cafeterias, audio announcements can be almost impossible to hear and understand. If an alarm with a light exists, it may be in a location difficult to see. There is a need for an alarm system which accommodates various types of notifications.

Further, conventional emergency alarm systems alert students and patrons of only one specific emergency, causing confusion and misunderstanding in the required response. Because different emergencies necessitate different responses, activating a fire alarm, for example, during an active shooter situation may cause individuals to misunderstand the threat. In addition, natural disasters are now occurring with increasing severity and frequency. There is a need for a customizable, understandable alarm system which is adaptable to a particular building or area's most likely natural disasters and weather threats or other emergencies. Accordingly, there is an ongoing need for a universal emergency alarm system that can easily be installed into existing alarm systems in various different buildings to notify students, workers, and patrons of various different emergencies.

Wireless Emergency Alerts ("WEA") is a United States public safety system that allows people who own compatible cell phones and other mobile devices to receive geographically targeted, text-like messages alerting them of imminent threats to safety in their area. WEA enables government officials to target emergency alerts to specific geographic areas. The Warning, Alert and Response Network (WARN) Act established WEA in 2008, and it became operational in 2012. Wireless companies volunteer to participate in WEA, which is the result of a unique public/private partnership between the Federal Emergency Management Agency, the FCC, and the United States wireless industry in order to enhance public safety. A WEA alert appears on the screen of the recipient's handset as a text-like message. The alert is accompanied by a unique attention signal and vibration, which is particularly helpful to people with hearing or vision-related disabilities. Many providers have chosen to transmit WEAs using a technology that is separate and different from voice calls and SMS text messages. WEA geographic precision can deliver the alerts to the area specified by the alert originator with no more than a 1/10 of a mile overshoot. CTIA, a U.S. wireless association, estimates that about 83 percent of consumers' smartphones support this enhancement in 2023, an increase from about 60 percent in 2022, 34 percent in 2021, and 18 percent in 2020. WEA alert originators include federal agencies (such as the National Weather Service) and state and local government authorities. Alerts from authenticated public safety officials are sent through FEMA's IPAWS system to participating wireless carriers.

However, not everyone has a cell phone or mobile device that is WEA-capable. Not all wireless service providers offer WEA, and some participating wireless service providers may offer WEA on some, but not all, of their mobile devices, and in some, but not all, of their service areas. So, while the WEA progress over the last few years is admirable, it does not alert 100% of people—especially when the affected population is primarily without mobile devices, such as children at a school. There is a need for a system to alert people of threats that doesn't rely solely on a WEA-capable mobile device. There is a need for citizens to be able to warn other citizens of threats rather than relying on federal agencies, state and local government authorities, and authenticated public safety officials.

There is a need for a community alarm system—one that is able to work within a specific zone—a neighborhood, a campus, a few city blocks, a street, a building, a facility, or the like. There is a need for people affected by an emergency situation to be able to see where the emergency started or where an alarm lever was pulled. There is a need for an alert application for mobile devices such as phones and watches that is accessible multiple ways, e.g., Wi-Fi, Bluetooth, cellular.

There is a need to link a universal emergency alarm system to a community alarm system so that members within a community can be informed when an emergency is occurring within that community.

SUMMARY

One embodiment of the present disclosure comprises a universal emergency alarm system capable of alerting occupants of one or more different types of emergencies through one universal alarm system with the use of one or more decentralized alarm panels and one or more alarms. Certain embodiments of the alarm system also comprise one or more centralized alarm panels and emergency dispatch. Emergencies can include weather or natural disaster emergencies, manmade or criminal activity emergencies, dangerous situation emergencies, Wireless Emergency Alerts (WEA) from state or local government authorities, or the like. A mobile app can be used to create, alert, and communicate with one or more connectivity zones, zone members, connectivity communities, community members, and emergency dispatch authorities.

Another embodiment of the present disclosure comprises a method for utilizing a universal emergency alarm system. A method for alerting occupants of one or more emergencies through one universal alarm system with the use of one or more decentralized alarm panels and one or more alarms. Certain embodiments of the alarm system also comprise one or more centralized alarm panels and emergency dispatch. Emergencies can include weather or natural disaster emergencies, manmade or criminal activity emergencies, dangerous situation emergencies, Wireless Emergency Alerts (WEA) from state or local government authorities, or the like. A mobile app can be used to create, alert, and communicate with one or more connectivity zones, zone members, connectivity communities, community members, and emergency dispatch authorities.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
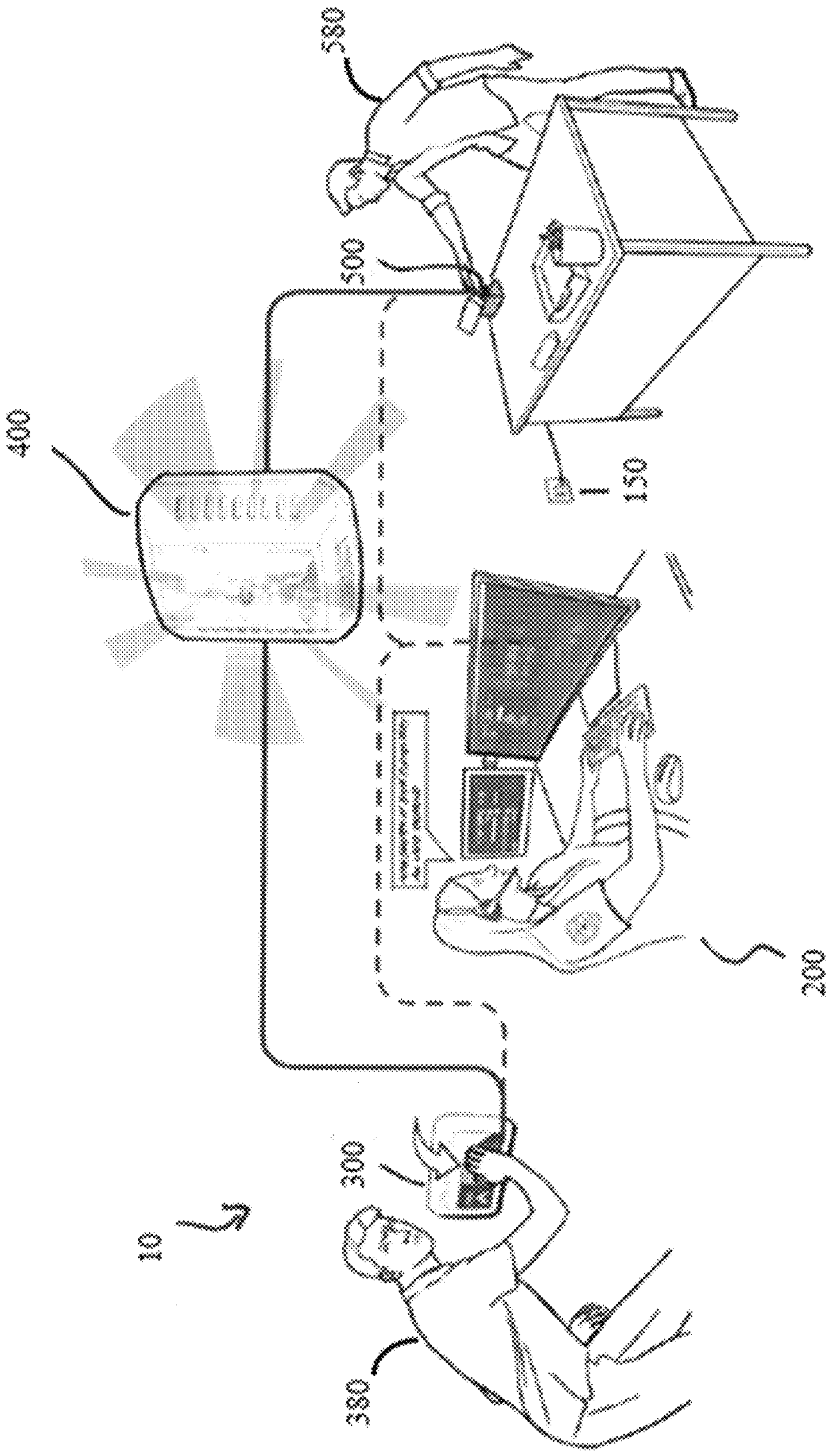
FIG. 1 depicts an example embodiment of the disclosed universal emergency alarm system.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed universal emergency alarm system is capable of alerting occupants of one or more emergencies through one universal alarm system with the use of one or more decentralized alarm panels ("DAP" or "DAPs"). Certain embodiments of the alarm system also comprise one or more centralized alarm panels ("CAP" or "CAPs"). Emergencies can include weather or natural disaster emergencies (e.g. tornado, hurricane/typhoon, earthquake, tsunami, dust storm, extreme wind, flash flood, severe thunderstorm, landslide, wildfire, volcanic eruption, avalanche), manmade or criminal activity emergencies (e.g., active shooter, airstrike, robbery, terrorism, bomb threat, hacking), dangerous situation emergencies (e.g., fire, gas leak, explosion, chemical spill, dam failure, power outage, disease, demonstration, car accident, lost child, missing person, medical incident, sudden cardiac arrest), Wireless Emergency Alerts (WEA) from state or local government authorities, or the like.

Figure 2:
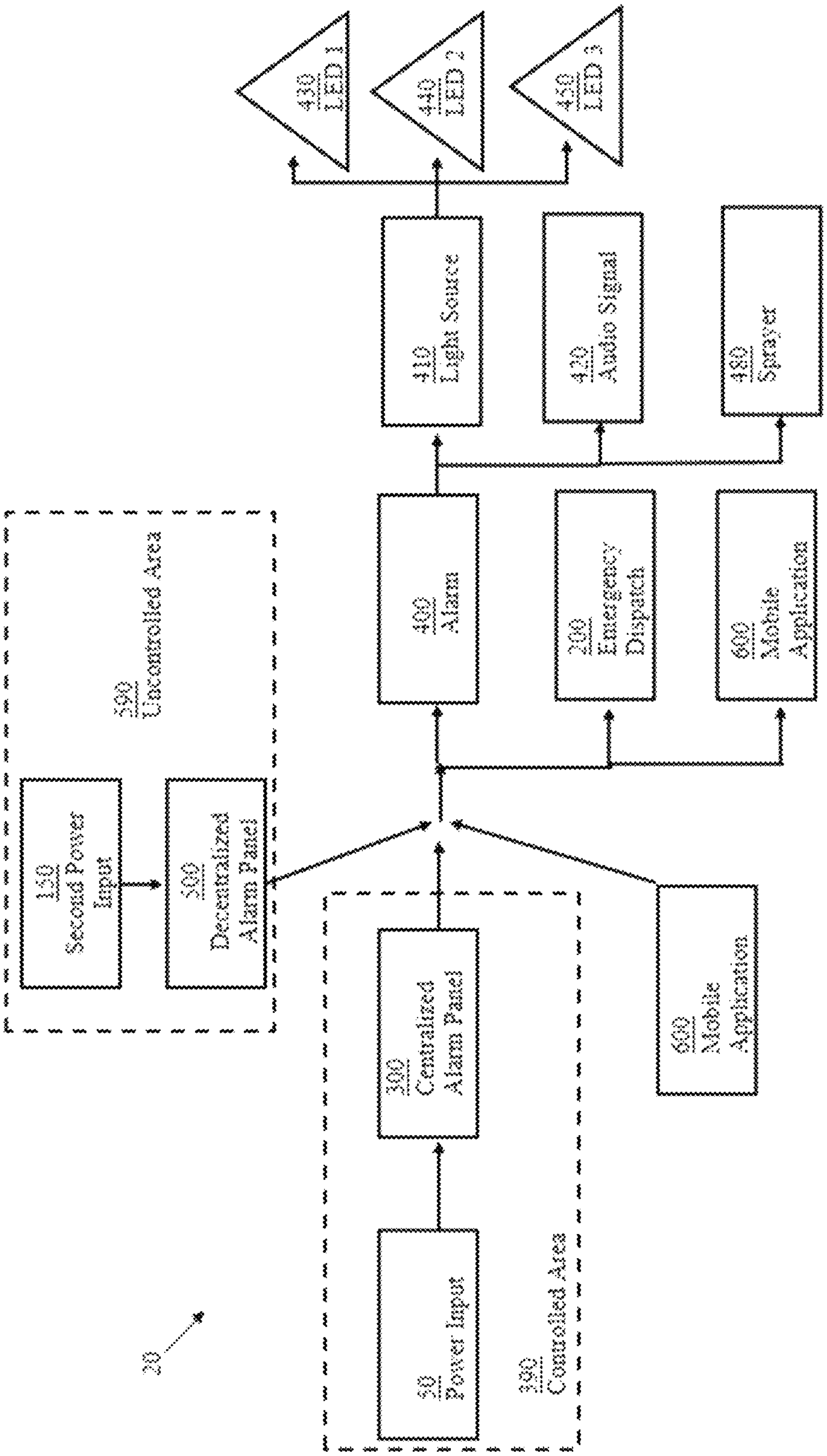
FIG. 2 is a block diagram illustration of the disclosed universal emergency alarm system of FIG. 1.

FIG. 1 depicts an example embodiment of the disclosed universal emergency alarm system 10, and FIG. 2 is a block diagram illustration 20 of universal emergency alarm system 10. Universal emergency alarm system 10 comprises emergency dispatch 200, one or more centralized alarm panels 300, an administrative occupant 380, one or more alarms 400, one or more DAPs 500, and a non-administrative occupant 580.

The alarm system 10 may be activated in various ways. In a first way, an administrative occupant (e.g., a principal) of a building (e.g., a school) may pull an emergency lever (e.g., a fire lever) on CAP 300 located in a controlled area 350 (e.g., a main office). In a second way, a non-administrative occupant (e.g., a teacher, a student, a staff member) of a building (e.g., a school) may pull an emergency lever (e.g. an active shooter lever) on a DAP located in a non-controlled area (e.g., on the teacher's desk in a classroom). In a third way, a non-occupant (e.g., a superintendent) may pull an emergency lever (e.g. a lockdown lever) on a remote alarm panel located remotely (e.g., a school district's administrative building).

One activated, the alarm system 10 communicates to emergency dispatch 200, activates one or more alarms 400, or both, depending on the system's programming.

Emergency dispatch 200 may be customized for each type of alarm such that one or more interested parties can be notified. For example, if a fire lever is pulled the fire department can be notified, if a tornado lever is pulled at a school then parents may be notified, and if an active shooter lever is pulled the police may be notified. Notification can be customized such that one or more interested parties may be notified at the same time or in a particular sequence.

In one embodiment, universal emergency alarm system 10 is a retrofitted system that utilizes existing power supply and wiring or wireless networks in buildings, allowing for CAP 300, alarm 400, and DAP 500 of universal emergency alarm system 10 to easily install in existing alarm systems. This can allow for faster and more efficient installation of emergency notification systems into existing alarm systems in and across various different buildings.

Figure 3:
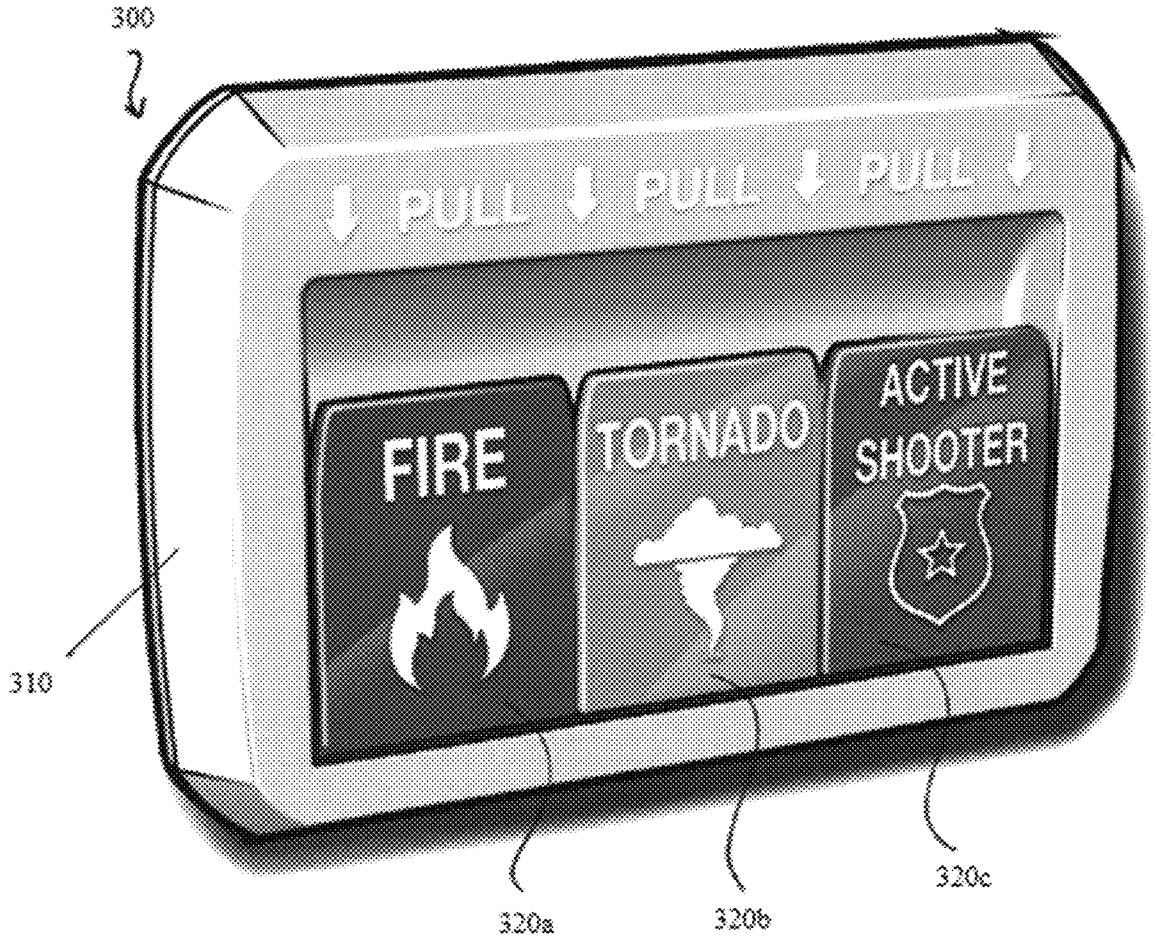
FIG. 3 depicts an example embodiment of the alarm panel included in the universal emergency alarm system of FIG. 1.

With reference to FIG. 2, a first power input 50 supplies electrical power to CAP 300. In one or more embodiments, CAP 300 is mounted or housed within controlled area 390 to prevent unauthorized occupants (such as perpetrators or non-administrative personnel) from activating, deactivating, or tampering with the universal emergency alarm system 10. Controlled area 390 may include customer service areas, administrative offices, school resources offices, or other similar areas intended for administrative personnel only. Emergency dispatch 200 and alarm 400 are in communication (e.g., electrical or wireless) with CAP 300. Activation of CAP 300 (via coded levers 320 as shown in FIG. 3) notifies emergency dispatch 200 of the specific emergency activated through CAP 300. Similarly, alarm 400 receives the specific emergency activated through CAP 300 and emits light source 410 with varying LED colors 430, 440, and 450 and flash patterns, as well as audio signal 420 with varying audio patterns, to notify individuals of the exact emergency situation.

In one embodiment, the alarm 400 comprises a sprayer 480. The sprayer 480 may be set to activate in certain emergency situations, such as a manmade or criminal activity emergency, for example to distract or disable an active shooter. The sprayer 480 may dispense water, fog, an asphyxiant gas, $CO_2$ gas, a chemical or biologic agent (such as pepper spray), flame retardant chemicals, or some other deterrent. In areas where a sprayer 480 is part of an emergency alarm system, teachers, employees, etc. may be educated of what to do after a sprayer dispenses, and their room may be equipped with a sprayer tool kit (comprising things such as a flashlight, mask, goggles, bullet-proof vest, firearm, weapon, or the like for one or more people) to allow them to be less affected or unaffected by the sprayer 480. The sprayer may be integral with the alarm 400, attached to alarm 400, located adjacent to alarm 400, or located remotely from alarm 400 (such as near the ground, ceiling, window, doorway, etc.). The sprayer 480 may comprise, activate, or be in fluid communication with an individual sprinkler or a sprinkler system. The sprayer 480 may comprise a nozzle 490.

In one or more embodiments, one or more alarms 400 are installed across various locations within a building or across various locations in a facility of buildings and each alarm 400 electrically or wirelessly communicates with another alarm 400. In one or more embodiments, activation of CAP 300 can notify students, parents, patrons, or other individuals via email, mobile application notification, or text message of the ongoing emergency.

In one or more embodiments, a second power input 150 located in an uncontrolled area 590 can supply electrical power to DAP 500 also located in uncontrolled area 590. DAP 500 can activate alarm 400 and notify emergency dispatch 200 from an isolated or remote location in a building or facility, outside of controlled area 390. DAP 500 permits non-administrative occupants to activate universal emergency alarm system 10 without having to access a controlled area 390 intended for administrative occupants. For example, multiple DAPs 500 can be installed in uncontrolled areas 590 like classrooms, libraries, cafeterias, gymnasiums, laboratories, or other areas in a school that are far removed from a controlled area 390 like a principal's office. In one or more embodiments, activation of DAP 500 can notify students, parents, patrons, or other individuals via email, mobile application notification, or text message of the ongoing emergency.

FIG. 3 depicts an example embodiment of CAP 300 included in universal emergency alarm system 10. CAP 300 comprises panel housing 310 that holds a plurality of coded levers 320. Each of coded levers 320 include identifying indicia (including emergency-specific text and/or symbols) and a specific color directed to a specific emergency situation. For example, a first lever comprises a first color and a first identifying indicia, a second lever comprises a second color and a second identifying indicia, and a third lever comprises a third color and a third identifying indicia. The identifying indicia on coded levers 320 can correspond to various emergency situations, including fire, serious weather, active shooting, lockdown, hazardous waste or chemical spills, or any other emergency situation where individuals are notified. In an embodiment, the identifying indicia is flush with the lever. In another embodiment, at least a portion of the identifying indicia is raised to provide tactile information to an occupant.

FIG. 3 depicts CAP 300 comprising housing 310 and three coded levers 320 directed to a fire emergency (red lever) 320*a*, a tornado emergency (yellow lever) 320*b*, and an active shooter emergency (blue lever) 320*c* in a non-activated first position. In another embodiment, alarm panel may include four coded levers 320 directed to a fire emergency, a serve weather emergency, an active shooter emergency, and a lockdown emergency. When the occupant pulls one of coded levers 320 directed to the ongoing emergency such that coded lever 320 is in an activated second position, emergency dispatch 200 is notified of the specific emergency activated. Simultaneously, alarm 400 receives electrical or wireless communication of the activated emergency in progress from CAP 300. In one or more embodiments, coded levers 320 can be buttons or touchscreen activated displays. Pushing coded levers 320 to the original, non-activated first position deactivates universal emergency alarm system 10. DAP 500 functions the same as CAP 300 described and depicted in FIG. 3, the first difference being that the coded levers on DAP 500 can be limited to only certain emergencies. For example, administrative personnel may wish to limit a lockdown emergency or a weather emergency to only CAP 300 contained in controlled area 50.

The DAP 500 included in universal emergency alarm system 10 may be the same or similar to the CAP 300. In some embodiments, the CAP and DAP have the same levers. In other embodiments, the CAP and DAP have one or more different levers, such as the CAP comprising more levers than the DAP. For example, a CAP may comprise levers for fire, tornado, active shooter, while a DAP may only comprise levers for fire and active shooter. The alarms may be hard wired into a wall, plugged into an electrical outlet and placed on a desk, mounted to the underside of a desk, etc.

In one or more embodiments, each CAP 300 and DAP 500 comprises an alpha/numeric indicator, unique ID, and/or internal global positioning system ("GPS") for determining the location of CAP 300 and DAP 500 activated during an emergency situation. In one or more embodiments, each CAP 300 and DAP 500 can further include video and motion recording capability. For instance, if a lever coded for "sudden cardiac arrest" is activated, it may notify staff to report to the activated alarm panel location with an automated external defibrillators (AED).

Figure 4B:
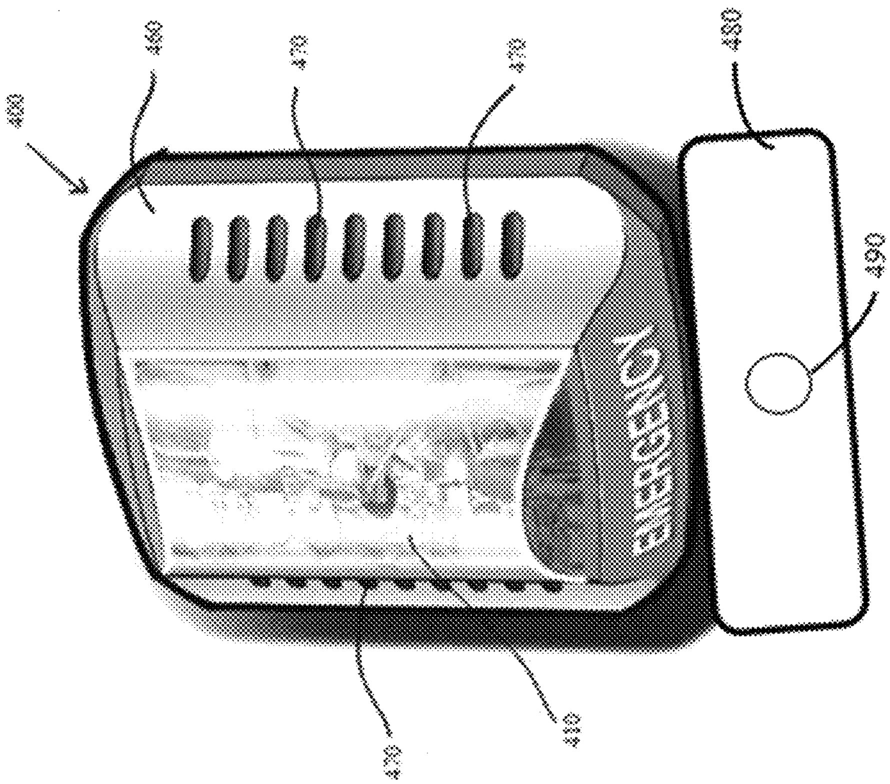
FIG. 4B depicts another example embodiment of the alarm included in the universal emergency alarm system of FIG. 1.
Figure 4A:
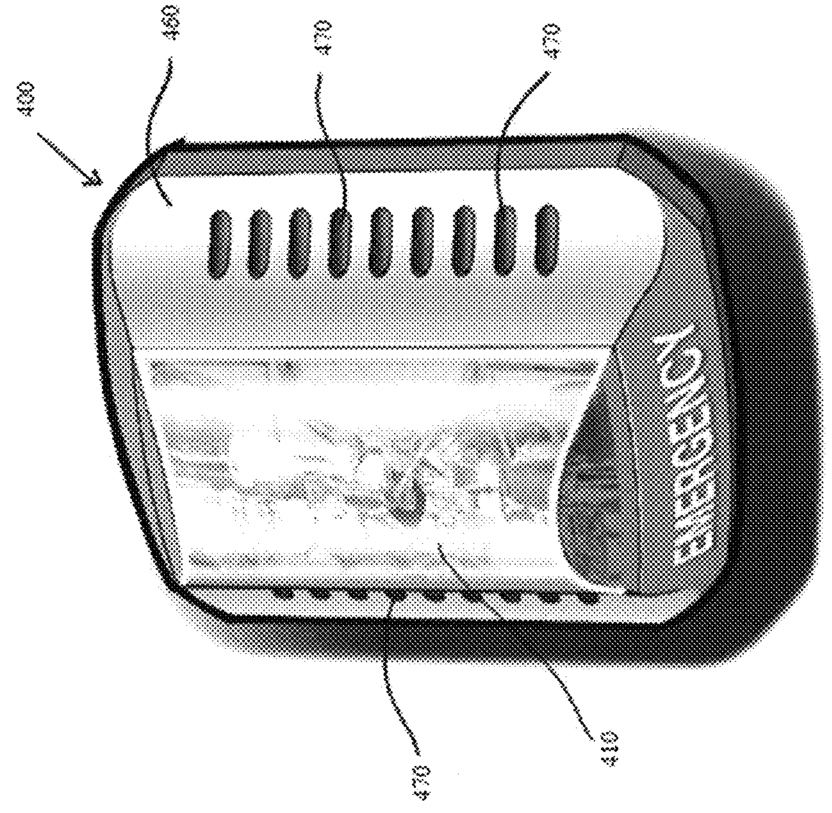
FIG. 4A depicts an example embodiment of the alarm included in the universal emergency alarm system of FIG. 1.

FIG. 4A depicts an example embodiment of alarm 400 included in universal emergency alarm system 10. Alarm 400 comprises alarm housing 460 with a plurality of audio signal holes 470 and light source 410 capable of strobing light. Alarm 400 receives, via electrical or wireless communication, the specific emergency activated by CAP 300 or DAP 500. Once alarm 400 receives the specific emergency, alarm 400 emits light source 410 with, e.g., LEDs 430, 440, 450 (see FIG. 2) directed to the specific emergency. LEDs 430, 440, 450 produce different colors and strobe patterns for each emergency situation activated. Further, alarm 400 emits audio signal 420 (see FIG. 2), through audio signal holes 470, having different audio patterns for each emergency situation activated. As stated previously, alarm 400 can communicate, either electrically or wirelessly, with other alarms 400 in a building or across multiple buildings of a facility.

FIG. 4B depicts another example embodiment of alarm 400 included in universal emergency alarm system 10, wherein the alarm comprises a sprayer 480 and nozzle 490.

Conventional fire alarms, which are required to be installed in schools, businesses, and other facilities, generally emit a flashing white strobe light with a pulse of three audio signals. Thus, universal emergency alarm system 10 can utilize lights and audio from existing fire alarm systems (emission of white lights and three audio signals), allowing for easier and more efficient installation of universal emergency alarm system 10. The specific strobe colors and flash patterns emitted from light source 410 assist in notifying individuals of specific emergencies in situations when audio is inaudible. Similarly, audio signals 420 emitted from alarm 400 contain specific audio patterns that assist in notifying individuals that may be visually impaired or obstructed from view of alarm 400.

Each alarm can have an alarm profile, customized by one or more of the following features: alarm lever color (e.g., red, blue, amber, white, orange, yellow, green, purple, pink), alarm type (e.g., fire, active shooter, tornado, lockdown), strobe light color (e.g., white, blue, amber, red, orange, yellow, green, purple, pink), strobe flash pattern (e.g., first pattern, second pattern, third pattern, fourth pattern), audio signal (e.g., first signal, second signal, third signal, fourth signal), sprayer instructions, etc. In some embodiments, the flash patterns are distinct for the various alarm types. In other embodiments, the flash patterns are the same for the various alarm types. In some embodiments, the audio signals are distinct for the various alarm types. In other embodiments, the audio signals are the same for the various alarm types. The alarm type may be labeled on the alarm lever with one or more words (e.g., fire, active shooter, tornado, lockdown), an icon (e.g., flame, police badge, funnel cloud, lock), a combination of words and icons, or combinations thereof, or the lever may have no label.

Figure 5:
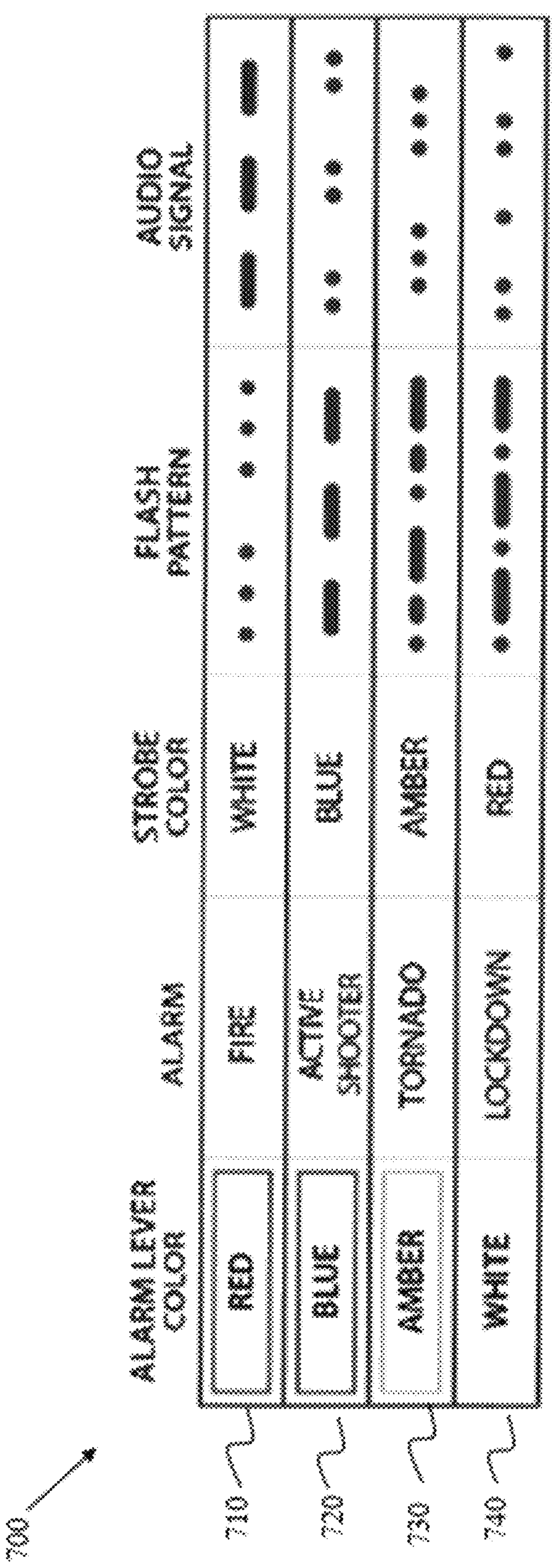
FIG. 5 depicts an example embodiment of strobe color and flash and audio patterns emitted from the alarm of FIG. 1.

FIG. 5 depicts an example embodiment of an alarm profile key 700 showing four different alarm profiles.

In a first alarm profile 710, activating a red-colored lever labeled "FIRE" on an alarm panel causes the alarm's light source to emit a white strobe light in a first flash pattern and causes the alarm's audio signal to emit a first audio signal. In a second alarm profile 720, activating a blue-colored lever labeled "ACTIVE SHOOTER" on an alarm panel causes the alarm's light source to emit a blue strobe light in a second flash pattern and causes the alarm's audio signal to emit a second audio signal. In a third alarm profile 730, activating an amber-colored lever labeled "TORNADO" on an alarm panel causes the alarm's light source to emit an amber strobe light in a third flash pattern and causes the alarm's audio signal to emit a third audio signal. In a fourth alarm profile 740, activating a white-colored lever labeled "LOCKDOWN" on an alarm panel causes the alarm's light source to emit a red strobe light in a fourth flash pattern and causes the alarm's audio signal to emit a fourth audio signal.

In one embodiment, the alarm system is used in a "connectivity zone"—a specific region (e.g., a neighborhood, a school district, a campus, an entertainment district, a business district, a few city blocks, a street, a building), within a certain radius of a particular building (e.g., a daycare, a school, a college or university, a hospital, a courthouse, a government building, a church, a mosque, a synagogue, a temple, a police station, an assisted-living facility, an airport, a theater, a stadium, or the like) where there is a wireless connection (e.g., via Wi-Fi, Bluetooth, cellular, or the like) among devices (e.g., mobile phones, smart watches, and other devices) that enables certain people within the connectivity zone (zone members) to alert one another and share information about emergencies. Zone members can see emergency information in real time, such as where an emergency started, where an alarm lever was activated, who activated it, when an emergency was cleared, and at what times. This enables zone members to have information as an emergency is unfolding.

This connectivity zone information can also be shared out more broadly to one or more "connectivity communities" different (e.g., larger radius, more public) from a connectivity zone. This information can be shared via a mobile application or other means. For instance, in response to an emergency alert, zone members could input their experiences or data via mobile device. For example, during an active shooter situation, zone members (students, teachers, administrative staff) in a school connectivity zone could see where and at what time a shooter entered a school building and what path the shooter took, and then make a decision if they run or hide. The information could also be shared with a connectivity community that includes community members such as parents to keep them updated in real time. Another example is connectivity zone members comprise medical personnel, a first connectivity community comprises patients as community members, and a second connectivity community comprises patients' families as community members. This would help people know if their loved ones are safe, or if they are near the emergency area or far from it. People nearby may choose to lock down, people further away may choose to move.

A mobile application (also referred to as "app") 600 can be used to automate the alarm system described herein. For example, someone with the mobile app may activate coded levers via their mobile device, receive an alert, provide information about an emergency, etc. In one embodiment, a "silent" alarm system may be implemented via a mobile application. In the case where someone is not sure whether there is a true emergency, they could activate a "pre-alarm" lever to alert others of suspicious behavior, malfunctioning equipment, or other abnormal condition that may pose a safety threat. This kind of silent alarm system would allow emergency response personnel to assess the situation without inciting panic by setting off strobe lights or loud sounds. A mobile app can be used to create and communicate with one or more connectivity zones, zone members, connectivity communities, community members, and emergency dispatch authorities.

A universal alarm system may comprise all of the features disclosed herein or only a few. In various embodiments, the system may be customized with these variables: types of emergencies (most common, most catastrophic), types of physical alerts (audio, visual, olfactory (smell), or combinations thereof), method of alert (physical, mobile application), people and organizations alerted, and the like. As used herein, "activate" "pull" "press" can be used interchangeably.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A universal emergency alarm system, comprising:

a. one or more decentralized alarm panels, wherein each panel is located in a non-controlled area and able to be activated by a non-administrative occupant, and wherein each panel comprises a housing and at least one coded emergency pull lever; and b. one or more alarms, wherein each alarm comprises a housing, a light source, and an audio signal;

wherein each coded emergency pull lever corresponds with a different alarm profile, and wherein, upon activation of a first coded emergency pull lever, a first alarm profile is executed by one or more alarms.

2. The universal emergency alarm system of claim 1, wherein each coded emergency pull lever of the one or more decentralized alarm panels can be a button or a touchscreen activated display.

3. The universal emergency alarm system of claim 1, further comprising one or more centralized alarm panels, wherein each centralized alarm panel is located in a controlled area and able to be activated by an administrative occupant, and wherein each centralized alarm panel comprises a housing and at least one coded emergency pull lever.

4. The universal emergency alarm system of claim 3, wherein each coded emergency pull lever of the one or more centralized alarm panels can be a button or a touchscreen activated display.

5. The universal emergency alarm system of claim 3, wherein the one or more decentralized alarm panel pull levers are coded the same as the one or more centralized alarm panel pull levers.

6. The universal emergency alarm system of claim 3, wherein the one or more centralized alarm panels comprises one or more differently-coded pull levers than the one or more decentralized alarm panel pull levers.

7. The universal emergency alarm system of claim 3, wherein the one or more centralized alarm panels comprises at least one more pull levers than the one or more decentralized alarm panel pull levers.

8. The universal emergency alarm system of claim 1, communicates to emergency dispatch, activates one or more alarms, communicates to mobile application, or combinations thereof.

9. The universal emergency alarm system of claim 1, wherein the system is capable of alerting one or more interested parties of an emergency.

10. The universal emergency alarm system of claim 9, wherein the one or more interested parties are selected from the group consisting of administrative occupants, non-administrative occupants, non-occupants, emergency dispatch, zone members, community members, and combinations thereof.

11. The universal emergency alarm system of claim 3, further comprising a mobile application that can be used to alert and communicate with zone members in one or more connectivity zones.

12. The universal emergency alarm system of claim 1, further comprising a mobile application that can be used to alert and communicate with community members in one or more connectivity communities.

13. The universal emergency alarm system of claim 1, further comprising a mobile application that can be used to activate one or more alarms.

14. The universal emergency alarm system of claim 1, wherein the light source is capable of generating one or more different colors of light.

15. The universal emergency alarm system of claim 1, wherein the light source is capable of generating one or more different strobe patterns of light.

16. The universal emergency alarm system of claim 1, wherein the audio signal is capable of generating one or more different patterns of audio.

17. The universal emergency alarm system of claim 1, wherein each alarm profile is customizable by one or more of the following features: alarm lever color, alarm type, strobe light color, strobe flash pattern, audio signal, sprayer instructions, and notification instructions.

18. The universal emergency alarm system of claim 1, wherein each alarm comprises a sprayer.

* * * * *